US007312697B2

(12) United States Patent
Veliu et al.

(10) Patent No.: US 7,312,697 B2
(45) Date of Patent: Dec. 25, 2007

(54) METHOD OF USING TELEMATICS UNITS TO PLACE COURTESY NOTIFICATIONS

(75) Inventors: Shpetim S. Veliu, Livonia, MI (US); Anthony J. Sumcad, Southfield, MI (US); Hitan S. Kamdar, Utica, MI (US)

(73) Assignee: General Motors Corporation, Detroit, MI (US)

( * ) Notice: Subject to any disclaimer, the term of this patent is extended or adjusted under 35 U.S.C. 154(b) by 88 days.

(21) Appl. No.: 11/110,145

(22) Filed: Apr. 20, 2005

(65) Prior Publication Data

US 2006/0238320 A1 Oct. 26, 2006

(51) Int. Cl.
*B60Q 1/00* (2006.01)
*H04Q 7/00* (2006.01)

(52) U.S. Cl. ............ 340/438; 340/995.16; 340/995.23; 340/425.5; 455/412.2; 455/412.1; 455/414.1

(58) Field of Classification Search ................ 340/438; 455/412.2, 414.1
See application file for complete search history.

(56) References Cited

U.S. PATENT DOCUMENTS

| | | | | |
|---|---|---|---|---|
| 6,492,912 | B1 * | 12/2002 | Jones | 340/994 |
| 6,850,839 | B1 * | 2/2005 | McGibney | 701/207 |
| 6,993,351 | B2 | 1/2006 | Fraser et al. | |
| 2003/0224762 | A1 * | 12/2003 | Lau et al. | 455/412.2 |
| 2004/0266398 | A1 * | 12/2004 | Adamczyk et al. | 455/412.1 |

* cited by examiner

*Primary Examiner*—Donnie L. Crosland

(57) ABSTRACT

A method of providing courtesy notifications from a mobile vehicle including receiving courtesy notification user input at a vehicle telematics unit, receiving a time and a date at the telematics unit, determining whether the courtesy date and the courtesy time correspond respectively to the received date and the received time and initiating a call to the courtesy number based on the determination. The courtesy notification user input includes a courtesy date, a courtesy time, a courtesy location and a courtesy number.

20 Claims, 4 Drawing Sheets

METHOD OF USING TELEMATICS UNITS TO PLACE COURTESY NOTIFICATIONS

FIELD OF THE INVENTION

This invention relates generally to placing courtesy notifications from a telematics unit. In particular, this invention relates to using courtesy notification user input received from a user to place courtesy notifications to the user.

BACKGROUND OF THE INVENTION

Many people use alarm clocks to wake-up or be reminded of an event. Some people have trouble waking up to a standard alarm clock. In some cases, the alarm clocks are clock radio alarms that turn on the radio to waken the user. At home, the user knows the local radio stations and presets the alarm to a known radio station that is broadcasting when the user is to be woken. When a user travels, the hotels often provide clock radios for alarms, however the user needs to take the time to learn how to operate the alarm. If the user wants to use the radio as the wake-up signal, the user needs to find out what radio stations operate in the local city at the time the user is to be woken. In many cases, the hotel provides a wake-up service, however the wake-up time can be off by up to plus or minus ten minutes from the indicated wake-up time.

It is desirable to provide a method and system to use a telematics unit to transmit a wake-up call to the user at exactly the user specified time. It is further desirable to provide a method and system to use a telematics unit to transmit a wake-up call to the user's portable communication device.

SUMMARY OF THE INVENTION

One aspect of the present invention provides a method of providing courtesy notifications from a mobile vehicle. The method includes receiving courtesy notification user input at a vehicle telematics unit, receiving a time and a date at the telematics unit, determining whether the courtesy date and the courtesy time correspond respectively to the received date and the received time and initiating a call to the courtesy number based on the determination. The courtesy notification user input includes a courtesy date, a courtesy time, a courtesy location and a courtesy number.

A second aspect of the present invention provides computer readable medium storing a computer program including computer readable code for receiving courtesy notification user input at a vehicle telematics unit, computer readable code for receiving a time and a date at the telematics unit, computer readable code for determining whether the courtesy date and the courtesy time correspond respectively to the received date and the received time, and computer readable code for initiating a call to the courtesy number based on the determination.

A third aspect of the present invention provides a system for providing courtesy notifications from a mobile vehicle. The system includes means for receiving courtesy notification user input at a vehicle telematics unit, means for receiving a time and a date at the telematics unit, means for determining whether the courtesy date and the courtesy time correspond respectively to the received date and the received time, and means for initiating a call to the courtesy number based on the determination.

The foregoing and other features and advantages of the invention will become further apparent from the following detailed description of the presently preferred embodiment, read in conjunction with the accompanying drawings. The detailed description and drawings are merely illustrative of the invention rather than limiting the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
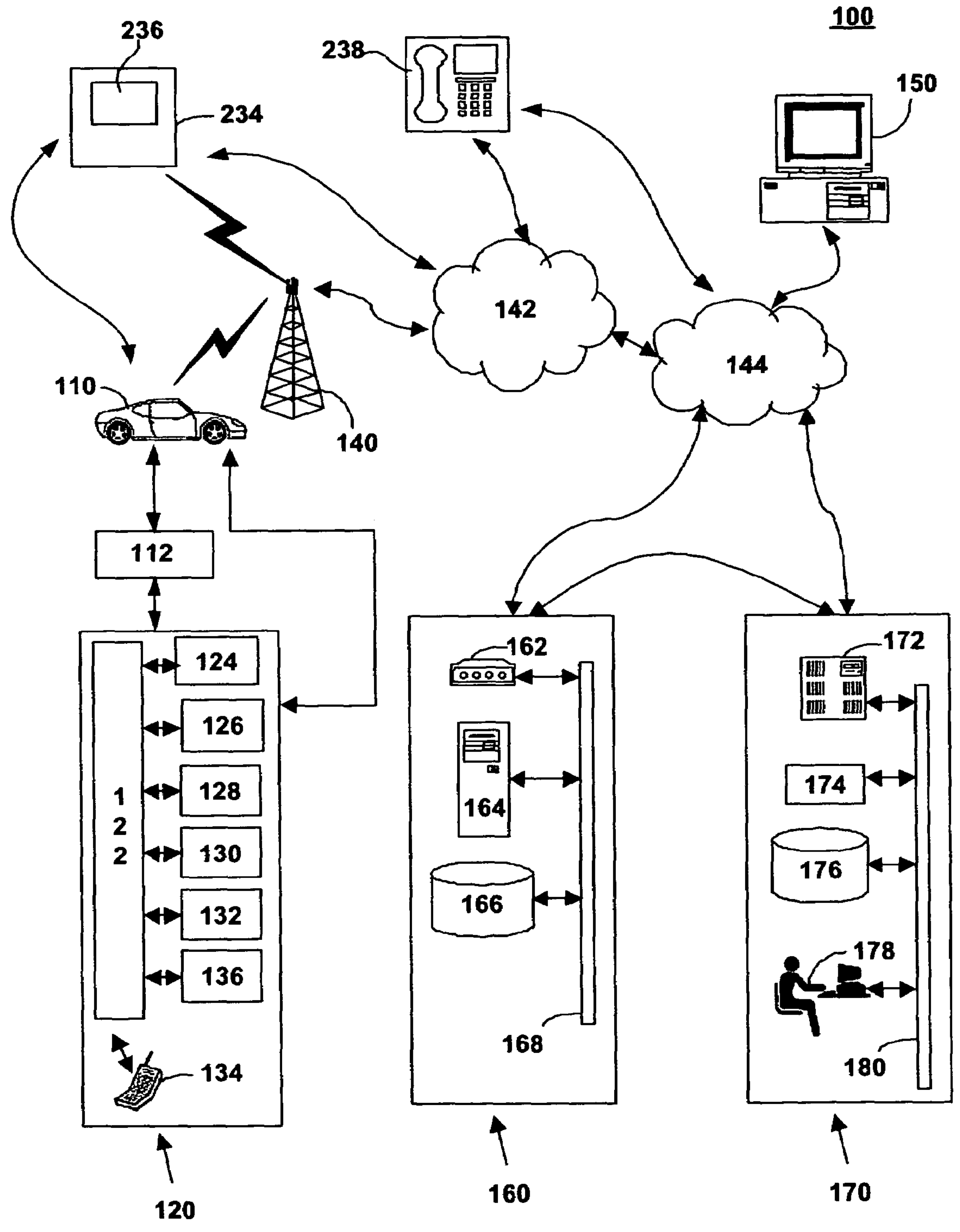
FIG. 1 is a schematic diagram of a system for providing access to a telematics system in a mobile vehicle.

FIG. 1 illustrates one embodiment of system for issuing a courtesy notification using a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and/or one or more call centers 170.

In one embodiment, MVCU 110 is in communication with a wireless portable communication device 234, such as, mobile phone or a personal digital assistant. In another embodiment, a display 236 is part of the wireless portable communication device 234. In another embodiment, the wireless portable communication device 234 includes short-range wireless receivers and transmitters. The short-range wireless receivers and transmitters can be Wi-Fi and/or Bluetooth devices as is known in the art. As used herein, the term "wi-fi" includes any radio transmission configured to broadcast within a limited range, such as less than one mile, and includes transmissions made under an industry standard, such as FCC part 13. "Wi-fi" includes, but is not limited to, 802.11 transmissions. In another embodiment, MVCU 110 is in communication with a phone 238 having a hardwire connection to one or more communication networks 142 or one or more land networks 144.

In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

Vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle portable communication device 134, such as, mobile phone or a personal digital assistant. In one embodiment, the embedded or in-vehicle portable communication device 134 includes short-range wireless receivers and transmitters. In this embodiment, telematics unit 120 includes short-range wireless receiver chips that are compatible with the Wi-Fi and/or Bluetooth technologies. The short-range wireless receivers and transmitters can be Wi-Fi and/or Bluetooth devices as described above.

In other embodiments, telematics unit 120 may be implemented without one or more of the above listed components. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In one embodiment, GPS unit 126 also provides a time and date stamp.

Processor 122 executes various computer programs that control programming and operational modes of electronic and mechanical systems within MVCU 110. Processor 122 controls communications (e.g. call signals) between telematics unit 120, wireless carrier system 140, and call center 170. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers.

A voice-recognition application including one or more speech recognition engines is installed in processor 122. Speech recognition engines translate human voice input through microphone 130 to digital signals. The one or more speech recognition engines installed in processor 122 include one or more speech generation algorithms. The speech generation algorithms translate digital signals into voice prompts, which are sent from processor 122 out through one or more speakers 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station pre-set selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and/or land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. In one embodiment, communication services manager 174 includes at least one analog and/or digital modem. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and/or network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Figure 2:
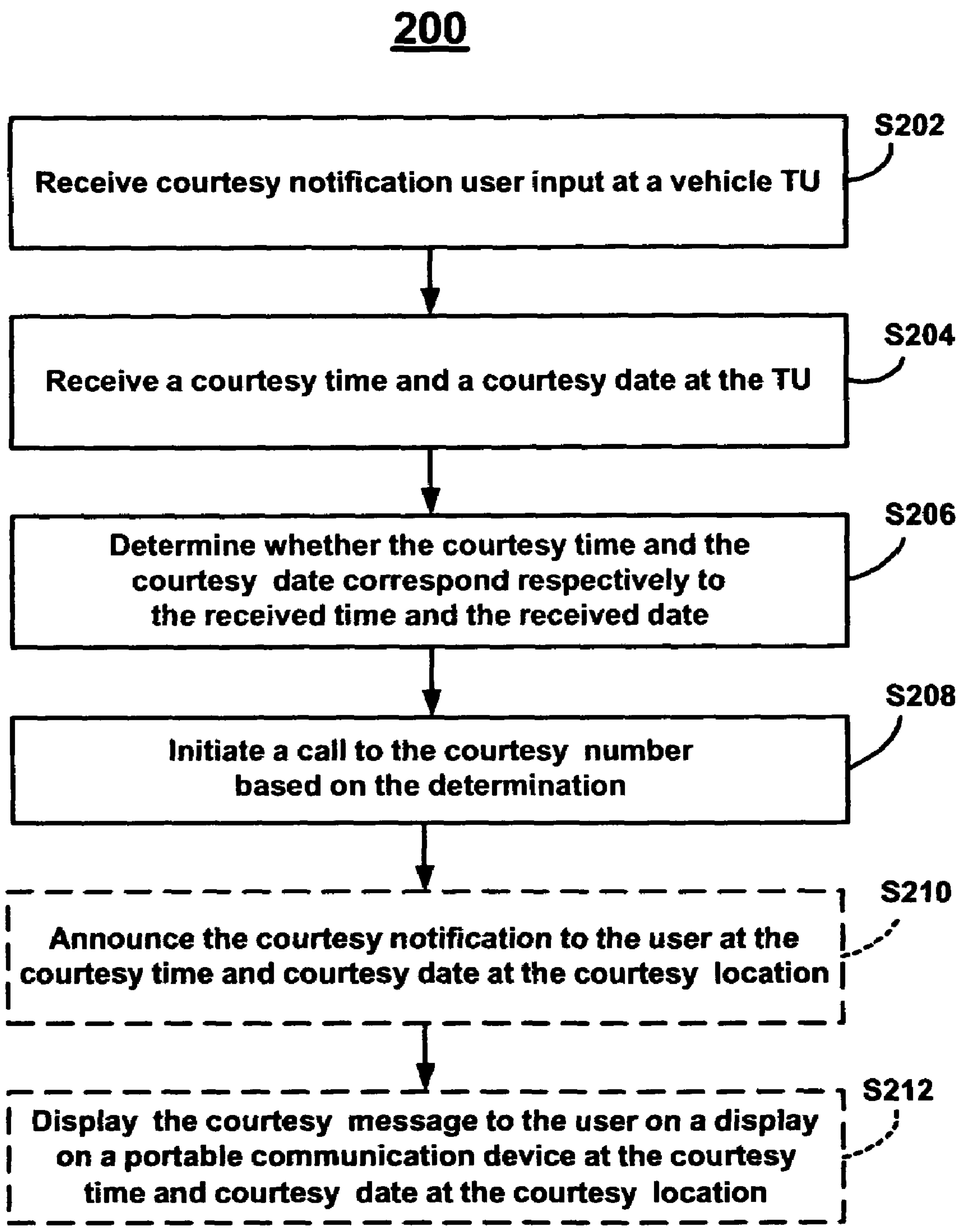
FIG. 2 illustrates a method of providing courtesy notifications from a mobile vehicle in accordance with the present invention.

FIG. 2 illustrates a method 200 representative of a method of providing courtesy notification from a telematics unit 120 in a MVCU 110 in accordance with the present invention. The vehicle telematics unit 120, the processor 122, the GPS unit 126, the in-vehicle memory 128, and the call center 170, have stored in computer readable medium at least one computer program including computer readable code to perform the operations described with reference to method 200.

During stage S202, the vehicle telematics unit 120 receives a courtesy notification user input. The courtesy notification user input includes, in one embodiment, a courtesy date, a courtesy time, a courtesy location, and a courtesy number. In one embodiment, the courtesy location is integral with the courtesy number. For example, the courtesy location is identified by an area code or country code of the courtesy number. In another embodiment, the courtesy notification user input also includes one or more of the following: a courtesy message to announce to the user when the courtesy notification is answered by the user; a number of days to call at this time starting from the courtesy date; a number of times to retry the courtesy number if the user does not answer the courtesy notification; and a number of times to retry the courtesy number if the courtesy notification was not established. In yet another embodiment, the telematics unit 120 has a preset number of times to retry the courtesy number if the user does not answer the courtesy notification or if the courtesy notification was not established. In yet another embodiment, the courtesy number is a first courtesy number and the courtesy notification user input includes a second courtesy number to be called if there is no answer at the first courtesy number, a number of times to retry the first courtesy number if the user does not answer or if the courtesy notification was not established, and a number of times to retry the second courtesy number.

The courtesy number, the first courtesy number, and the second courtesy number may be a home phone number, a wireless cell phone number, a pager phone number, a portable wireless communication device number, a personal digital assistant number, an email address, a landline phone number, a hotel phone number, or combinations thereof. If the courtesy number is a hotel phone number, the courtesy notification user input includes a courtesy message, which announces a request for connection to the room of the user. In that case, when the hotel operator receives the courtesy notification, the hotel operator hears a courtesy message, such as, "Please connect me to the room of John Doe, last name spelled D, O, E." The courtesy notification then goes through to the user's room and the ringing of the phone in the room wakes the user.

In yet another embodiment, the courtesy notification user input includes a hotel indicator, which is set by the user if the courtesy number is a hotel phone number. When the hotel indicator is set, the telematics unit 120 maintains the courtesy notification for a preset amount of time and the courtesy message is repeated a configurable number of times at configurable time interval. This maintains the connection while the operator places the call to the hotel room. This also ensures that the hotel operator hears the name of the user a second time if necessary.

The courtesy notification user input is stored in the in-vehicle memory 128. In one embodiment, after storing the courtesy notification user input, the telematics unit 120 transmits the courtesy notification user input to the call center 170 and the courtesy notification user input is stored in one or more communication services databases 176 in the call center 170. In another embodiment, the telematics unit 120 does not store the courtesy notification user input but transmits the courtesy notification user input to the call center 170. In that embodiment, the courtesy notification user input is stored in one or more communication services databases 176 in the call center 170.

The courtesy notification user input is received at the telematics unit 120 via an input mechanism. The input mechanism may be a voice-recognition application in the telematics unit 120, an advisor 178 in the MVCS 100, a personal or user computer 150 in communication with the MVCS 100, a wireless portable communication device 234, a personal digital assistant, or combinations thereof. In an exemplary case, the user enters the courtesy notification user input on a personal or user computer 150, which is in communication with one or more web-hosting portals 160 in the MVCS 100.

In another exemplary case, the user announces the courtesy notification user input into a microphone 130 or speakers 132 in the MVCU 110 and the speech recognition engines of the voice-recognition application in the telematics unit 120 recognize the input as a request for a courtesy notification. The voice-recognition application then transmits a signal indicating the courtesy notification request to the processor 122. The one or more speech recognition engines installed in processor 122 include one or more speech recognition algorithms. If the announced courtesy notification user input includes a courtesy message, the speech recognition engines translate the audio courtesy message into digital signals, which are stored in the in-vehicle memory 128.

In yet another exemplary case, the user provides the courtesy notification user input to an advisor 178, real or virtual, at the call center 170 from the telematics unit 120. In this case, the call center 170 stores the courtesy notification user input in the one or more communication services databases 176. In another embodiment of this case, the call center 170 also transmits the courtesy notification user input to the telematics unit 120 for storage in the in-vehicle memory 128.

During stage S204, the telematics unit receives a time and a date. This time and date are the current local time at the telematics unit location. The processor 122 temporarily stores the time and date in the in-vehicle memory 128. In one embodiment, telematics unit 120 receives the time and date periodically. The period in which the telematics unit 120 receives the time and date is preset and constant. In another embodiment, the period in which the telematics unit 120 receives the time and date varies. For example, the period with which the telematics unit 120 receives the time and date can shorten from once every hour to once every 2 minutes when the received date matches the courtesy date.

In yet another embodiment, telematics unit 120 receives the current local time and current local date at the location of the telematics unit 120 when the courtesy notification user input is received. In this case, the processor 122 calculates the amount of time from the current local time and current local date to the courtesy time and courtesy date, stores the calculated time in the in-vehicle memory 128, and sets an internal clock to zero. When the clock reaches the calculated time the telematics unit 120 takes additional action, as described below with reference to stage S206.

In yet another embodiment, telematics unit 120 receives the current local time and current local date at the location of the telematics unit 120 and calculates the current time at the courtesy location and the current date at the courtesy location. Then the processor 122 calculates the amount of time from the current time at the courtesy location and the current date at the courtesy location to the courtesy time and courtesy date at the courtesy location, stores the calculated time in the in-vehicle memory 128, and sets the internal clock to zero. This embodiment is used when the courtesy location and the telematics unit location are in different time zones. The method for determining the correspondence between the time and date in one location and the time and date in a remote location is described in detail below with reference to method 300 in FIG. 3 and method 400 in FIG. 4.

In one embodiment, the time and date are a local global positioning system (GPS) time and a local GPS date, respectively, transmitted from a GPS system to the GPS unit 126 in the telematics unit 120 to provide an accurate reading of the current local time and current local date. In another embodiment, the time and the date are the local cellular time and local cellular date, respectively. The local cellular time and local cellular date are embedded in a local cellular time signal and local cellular date signal, respectively, transmitted from the wireless carrier system 140 in the MVCS 100 to the telematics unit 120.

If the telematics unit 120 is in a quiescent state, the telematics unit powers itself up to received the time and the date. Normally when the MVCU 110 is off, the telematics unit is placed into a quiescent state wherein the telematics unit in a low-power, minimally functional state to preserve battery life. The telematics unit 120 in the MVCU 110 may also be placed into a similar wake up cycle to minimize power drain on the battery. To receive the time and the date while the ignition is off, the MVCU 110 is awakened as a part of the wake up cycle. After stages S204-S214 of method 200 occur, the MVCU 110 is placed back into the wake up cycle to minimize battery drain. In one embodiment, the receipt of the time and the date of stage S204 is synchronized with the power-up time of the wake up cycle. To coordinate power up of the telematics unit 120 with receipt of the time and date, the time at the call center 170 may need to be synchronized with time at the MVCU 110. In one embodiment, this process of discontinuous receive is accomplished with analog cellular hardware.

U.S. patent application Ser. No. 10/011,689 (Attorney Docket No. GP-301862), the entirety of which is hereby incorporated by reference, assigned to the assignee of this application describes one alternative embodiment of placing the MVCU 110 in the wake up mode, while occasionally entering a "vehicle-awake" state for receiving the time and date and, if necessary, for placing a courtesy notification.

During stage S206, the telematics unit 120 determines whether the courtesy time and the courtesy date received during stage S202 correspond respectively to the received time and the received date received during stage S204. The processor 122 compares the courtesy time with the received time and then compares the courtesy date with the received date to make the determination.

Referring now to the embodiments in which the processor 122 calculates the amount of time from the current local time and current local date to the courtesy time and courtesy date and sets the clock to zero, when the elapsed time on the clock matches the calculated time, the telematics unit 120 determines that the courtesy time corresponds to the received time and the courtesy date corresponds to the received date.

In one embodiment, the call center 170 receives the time and the date during stage S204 and determines whether the courtesy time and the courtesy date received during stage S202 correspond respectively to the received time and the received date received during stage S204. Communication services manager 174 compares the courtesy time with the received time and compares the courtesy date with the received date to make the determination. In this case, the courtesy time and courtesy date are stored in one or more communication services databases 176.

In some cases, the courtesy location is in a different time zone from the telematics unit location and/or the call center location. In some cases the courtesy location crosses the International Date Line and the courtesy date at the courtesy location is different from the courtesy date at the telematics unit location and/or the call center location. The method for determining the correspondence between the courtesy time and courtesy date in a remote location and the current time and current date in the telematics unit location and/or the call center location is described in detail below with reference to method 300 in FIG. 3 and method 400 in FIG. 4.

During stage S208, the telematics unit 120 initiates a call to the courtesy number when a positive determination is made during stage S206.

The telematics unit 120 issues the courtesy notification to the courtesy number via one or more wireless carrier systems 140, one or more communication networks 142, one or more land networks 144. An audible sound emitted from the phone 238 or portable device 234 will alert the user who requested the courtesy notification.

In one embodiment, the portable communication device 234 has a "sleep mode" and cycles on when the courtesy notification is transmitted from the telematics unit 120.

Referring now to the embodiments in which the call center 170 made the determination during stage S206, the call center 170 initiates an alert to the courtesy number based on a positive determination being made during stage S206. Alternatively, the call center 170 transmits a command to place the courtesy notification to the telematics unit 120.

Referring now to the embodiment in which the telematics unit 120 transmitted the courtesy notification user input to the call center 170 and the courtesy notification user input was stored in the communication services databases 176 in the call center 170, the telematics unit 120 transmits a vehicle data upload to the call center 170 with a command to the call center 170 to place the courtesy notification to the courtesy number. As the term is used herein, a vehicle data upload is a connection initiated by the telematics unit 120 to the call center 170, responsive to at least one trigger. A trigger is any event that has been predetermined to result in taking of predetermined actions. In this case, the trigger is a positive determination during stage S206.

In one embodiment, both the telematics unit 120 and the call center 170 synchronously implement stages S202 through S206. Upon a positive determination being made during stage S206, the telematics unit 120 implements stage S208 and issues a courtesy notification confirmation to the call center 170 after successfully placing the courtesy notification to the courtesy number. Upon the positive determination being made during stage S206, the call center 170 waits a predetermined time for the courtesy notification confirmation from the telematics unit 120. If the courtesy notification confirmation is not received within the predetermined time, the call center 170 places the courtesy notification to the courtesy number. In one embodiment, the predetermined time is in the range of 1 to 5 minutes and is stored in the communication services databases 176. In this manner, the courtesy notification is placed to the user in the event that the telematics unit 120 is out of range of the one or more wireless carrier systems 140.

In another embodiment, the call center 170 implements stages S202 through S208. In this case, the courtesy notification user input can be entered at the telematics unit 120 and transmitted to the call center 170.

The billing for the courtesy notification service can be based on each use of the courtesy notification or it can be a monthly service fee paid by the user.

Stage S210 is optional. During stage S210, the telematics unit 120 announces the courtesy message to the user at the courtesy time and the courtesy date at the courtesy location. The courtesy message is generated by the voice-recognition application in the telematics unit 120. The one or more speech recognition engines installed in processor 122 include one or more speech generation algorithms. If the user announced the courtesy notification user input at microphone 130 in the MVCU 110, the speech recognition engines receive the audio courtesy message as audio digital signals, which are stored in the in-vehicle memory 128. If the courtesy message was input as text at a personal or user computer 150, the speech recognition engines translate received text input into audio digital signals, which are stored in the in-vehicle memory 128. The speech generation algorithms translate audio digital signals into an audio courtesy message. The audio courtesy message is sent from processor 122 and announced to the user when the courtesy notification is answered.

Stage S212 is an option when the courtesy notification is sent to a portable communication device 234, which has a display 236. During stage S212, the text of the courtesy message is displayed to the user on a display 236 of the portable communication device 234 at the courtesy time and courtesy date at the courtesy location. The portable communication device 234 also emits an audible signal, such as, a ring, chirp or beep, in addition to displaying the courtesy message.

If the user announced the courtesy notification user input at microphone 130 in the MVCU 110, the speech recognition engines translate the received audio courtesy message into text digital signals, which are stored in the in-vehicle memory 128. If the courtesy message was input as text at a personal or user computer 150, the speech recognition engines stores the received text input as text digital signals, which are stored in the in-vehicle memory 128. The speech generation algorithms translate the text digital signals into a text courtesy message. The text courtesy message is sent from processor 122 and displayed to the user on the display 236 of the portable communication device 234. The processor 122 has embedded software operable to recognize if the receiving device has a display 236 and transmits the text digital signals.

Figure 3:
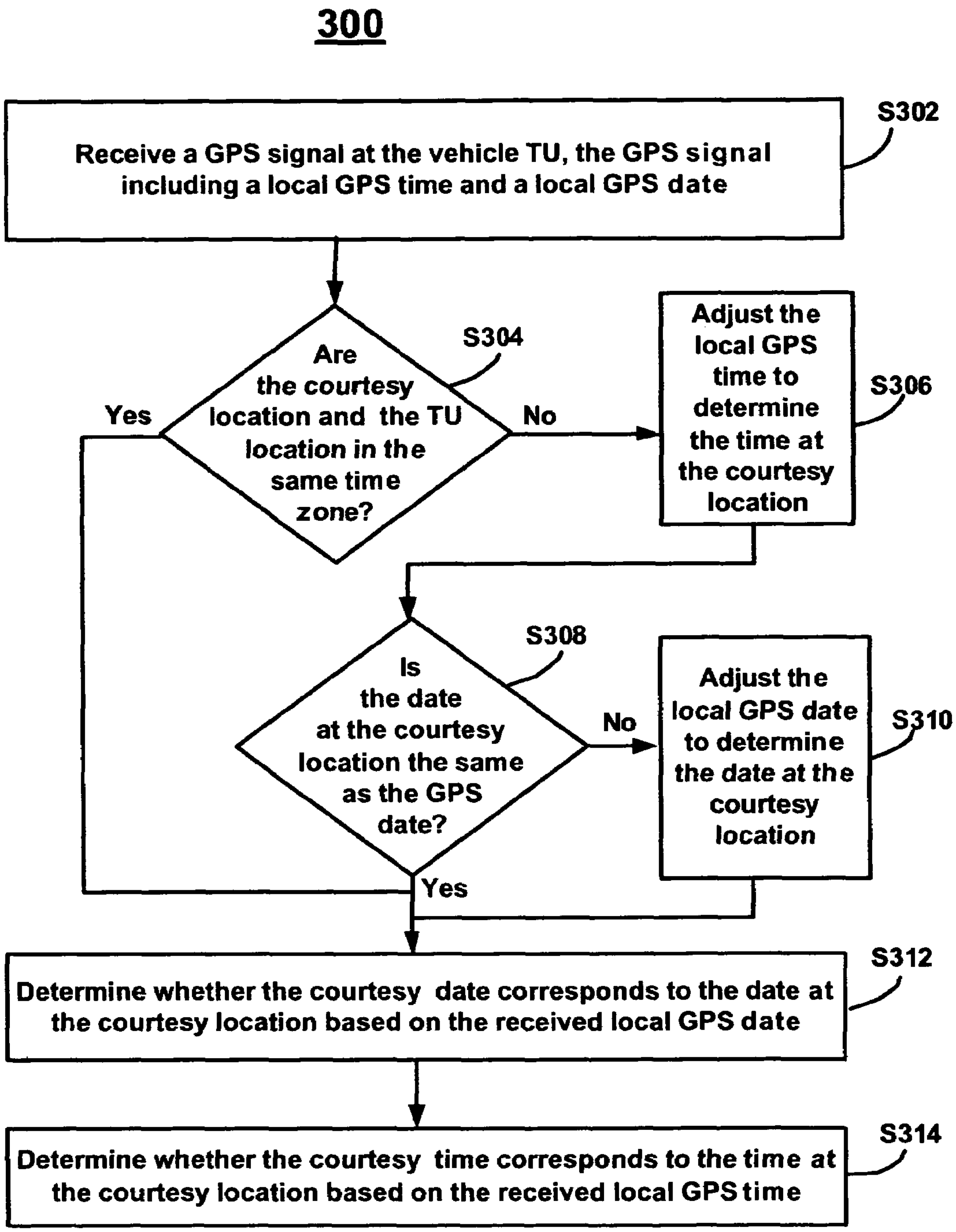
FIG. 3 illustrates a method for receiving a time and a date at the telematics unit in accordance with a first embodiment of the present invention.

FIG. 3 illustrates a method 300 for receiving a time and a date at the telematics unit 120 in accordance with a first embodiment of the present invention. In this first embodiment, method 300 describes how the telematics unit 120 receives the local time and local date at the telematics unit location from a GPS broadcast signal and adjusts the current local time and current local date to determine the current time and current date at a remote location. The vehicle telematics unit 120, the processor 122, the GPS unit 126, the in-vehicle memory 128, and the call center 170, have stored in computer readable medium at least one computer program including computer readable code to perform the operations described with reference to method 300.

During stage S302, the GPS unit 126 of the telematics unit 120 receives a GPS signal. GPS satellite broadcast systems (not shown) transmit GPS broadcast signals, which include the local GPS time, the local GPS date and the longitude and latitude coordinates of the telematics unit 120. The local GPS time and a local GPS date are, respectively, the current local time and current local date at the telematics unit location.

During stage S304, the telematics unit 120 determines if the courtesy location and the telematics unit (TU) location are in the same time zone. The processor 122 determines an area code and a zip code of the telematics unit 120 from the longitude and latitude coordinates of the telematics unit 120 using an area code/zip code look-up table. The area code/zip code look-up table includes the area code and zip codes as a function of longitude and latitude coordinates ranges. A time zone look-up table is stored in the in-vehicle memory 128. The time zone look-up table has the time zones for the country codes, the United States zip codes, and the United States area codes. The courtesy location was stored in the telematics unit 120 and/or call center 170 as described above with reference to stage S202 of method 200 in FIG. 2.

The user may have entered the courtesy location as a city, a state, a zip code, a country and/or a city in a country. The processor 122 compares the city, state, zip code, and/or country of the telematics unit 120 with the respective city, state, zip code, and/or country of the courtesy location to determine if they match. If the city, state, zip code, and/or country of the courtesy location match the respective city, state, zip code, and/or country of the telematics unit location, the flow proceeds to stage S312. In another embodiment, the courtesy location is determined as the end point of a route provided by the call center.

If the user entered a courtesy location that differs from the telematics unit location, the processor 122 applies an algorithm to a time zone look-up table to determine if the courtesy location is in the same time zone as the telematics unit location. If the courtesy location is in the same time zone as the telematics unit location, the flow proceeds to stage S312.

In one embodiment, the area code or country code of the courtesy number indicate the courtesy location. In that case, the telematics unit 120 compares the area code and/or country code in the courtesy notification user input with the area code and/or country code at the telematics unit location. If they match, the flow proceeds to stage S312. In the event that the country code indicates a country that extends geographically over more than one time zone, the courtesy location must include a city in that country to determine the time zone of the courtesy location.

If the area code and/or country code in the courtesy notification user input do not match the area code and/or country code at the telematics unit location, the processor 122 applies an algorithm to a time zone look-up table to determine if the courtesy location is in the same time zone as the telematics unit location. If the courtesy location is in the same time zone as the telematics unit location, the flow proceeds to stage S312.

In an embodiment in which the courtesy notification user input did not include either a courtesy location or a courtesy number with an area code or a country code, the telematics unit 120 recognizes that the courtesy location as being the same as the telematics unit location and the flow proceeds to stage S312.

If the telematics unit 120 determines that the courtesy location and the telematics unit location are not in the same time zone, the flow proceeds to stage S306. During stage S306, the telematics unit 120 adjusts the local GPS time to determine the time at the courtesy location. The processor 122 applies an algorithm to determine the number of time zones and the resultant amount of time between the courtesy location and the telematics unit location. The processor 122 also applies an algorithm to determine if the change in time zones requires that time be added to or subtracted from the local GPS time. Typically, the difference in time zones is equal to the number of hours that must be added to or subtracted from the GPS time. The processor 122 adds or subtracts the calculated number of hours to or from the local GPS time. The algorithm is programmed to account for the time zone difference for locations that does not observe day light savings in the United States. The processor 122 stores the current time at the courtesy location in the in-vehicle memory 128. In one embodiment, the processor 122 temporarily stores the current time at the courtesy location in the in-vehicle memory 128. The flow proceeds to stage S308.

During stage S308, the telematics unit 120 determines if the date at the courtesy location is the same as the date at the telematics unit (TU) location. If a user has crossed the International Date Line, the date at the courtesy location can be off by one day from the date at the telematics unit (TU) location. The processor 122 applies an algorithm to a date look-up table in the in-vehicle memory 128 to determine if the date at courtesy location is different from the local GPS date at the telematics unit location. If the current date at courtesy location is the same as the current local GPS date at the telematics unit location, the flow proceeds to stage S312.

If the current date at the courtesy location is not the same as the current date at the telematics unit location, the flow proceeds to stage S310. During stage S310, the telematics unit 120 adjusts the local GPS date to determine the date at the courtesy location. The processor 122 adds one day to or subtracts one day from the local GPS date at the telematics unit location according the determination made during stage S308. The processor 122 stores the current date at the courtesy location in the in-vehicle memory 128. In one embodiment, the processor 122 temporarily stores the current date at the courtesy location in the in-vehicle memory 128. The flow proceeds to stage S312.

During stage S312, the telematics unit 120 determines whether the courtesy date corresponds to the date at the courtesy location based on the received local GPS date and any modifications to the local GPS resulting from algorithms applied during stage S310. To make the determination, the processor 122 compares the courtesy date with the unadjusted local GPS date or, if an adjustment was made during stage S310, the processor 122 compares the courtesy date with the adjusted GPS date that was stored in the in-vehicle memory 128.

During stage S314, the telematics unit 120 determines whether the courtesy time corresponds to the time at the courtesy location based on the received local GPS time and any modifications to the local GPS time resulting from algorithms applied during stage S306. To make the determination, the processor 122 compares the courtesy time with the unadjusted local GPS time or, if an adjustment was made during stage S310, the processor 122 compares the courtesy time with the adjusted GPS time that was stored in the in-vehicle memory 128.

When a positive determination is made during stages S312 and S314, the flow proceeds to stage S208 described above with reference to method 200 of FIG. 2.

In one embodiment, the call center 170 performs the function of the telematics unit 120 as described above for method 300. In this case, one or more communication services databases 176 perform the function of the in-vehicle memory 128, and one or more communication services managers 174 perform the function of the processor 120. In another embodiment, the call center 170 and telematics unit 120 each perform the functions of the telematics unit 120 as described above for method 300. In yet another embodiment, the call center 170 performs the function of the telematics unit 120 as described above for method 300 and transmits the adjusted current local time and date to the telematics unit 120 when a positive determination is made during stages S312 and S314. In yet another embodiment, the telematics unit 120 transmits the adjusted current local time and date to the call center 170 when a positive determination is made during stages S312 and S314 so that the call center 170 can initiate a courtesy notification to the courtesy number.

Figure 4:
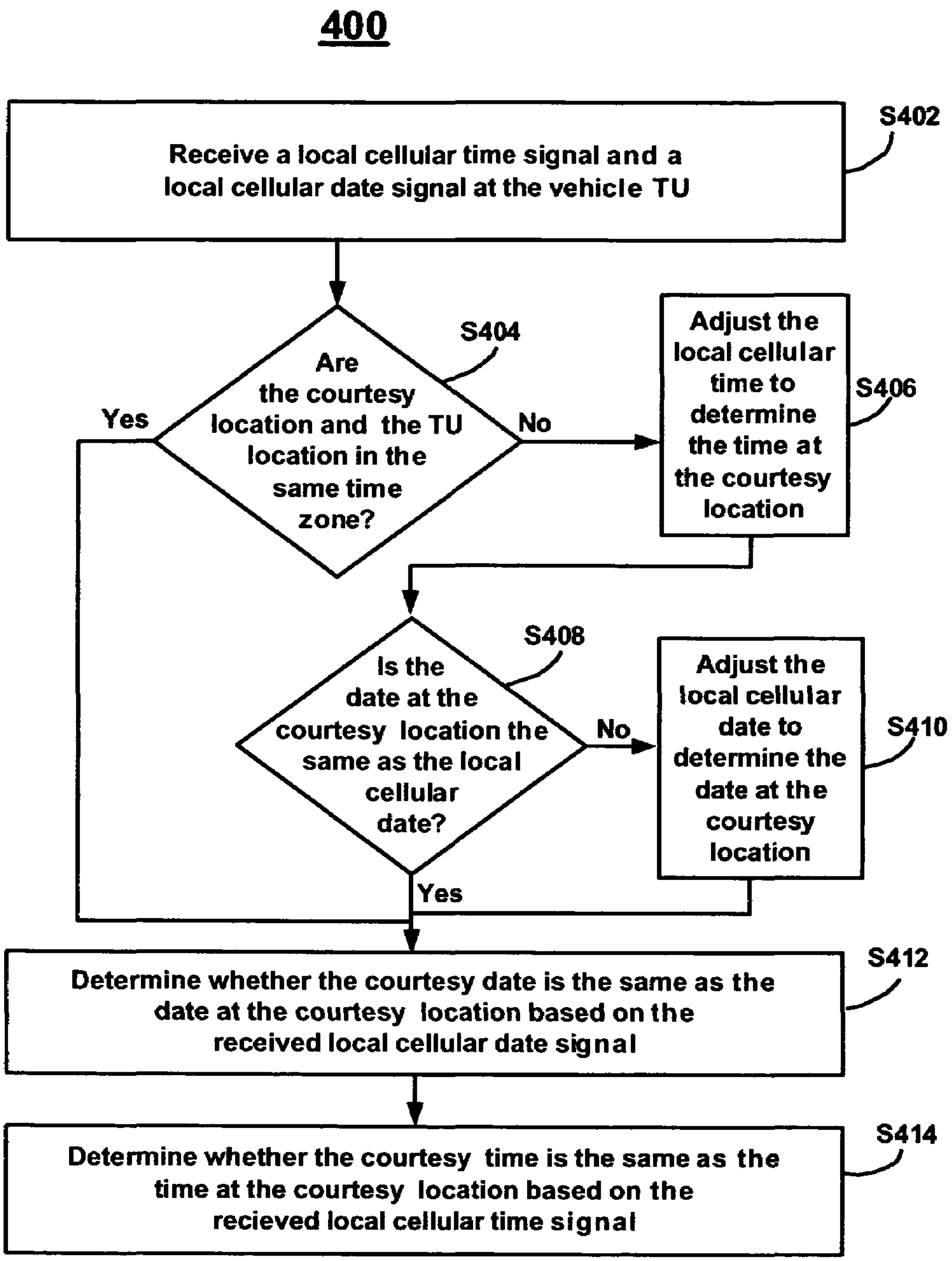
FIG. 4 illustrates a method for receiving a time and a date at the telematics unit in accordance with a second embodiment of the present invention.

FIG. 4 illustrates a method 400 for receiving a time and a date at the telematics unit in accordance with a second embodiment of the present invention. In this second embodiment, method 400 describes how the telematics unit 120 receives the local time and local date at the telematics unit location from a wireless carrier system signal and adjusts the current local time and date to determine the current time and current date at a remote location. The vehicle telematics unit 120, the processor 122, the wireless carrier system 140, the in-vehicle memory 128, and the call center 170, have stored in computer readable medium at least one computer program including computer readable code to perform the operations described with reference to method 400.

During stage S402, the telematics unit 120 receives a local cellular time signal and a local cellular date signal from the wireless carrier system 140. The local cellular time signal and a local cellular date signal are, respectively, the current local time and current local date at the telematics unit location. In one embodiment, the telematics unit 120 requested the time and date from the wireless carrier system 140.

During stage S404, the telematics unit 120 determines if the courtesy location and the telematics unit (TU) location are in the same time zone as described above with reference to stage S304 of method 300 in FIG. 3. The flow proceeds from stage S404 to either stage S412 or stage S406, based on the determination of stage S404.

If the telematics unit 120 determines that the courtesy location and the telematics unit location are not in the same time zone, the flow proceeds to stage S406. During stage S406, the telematics unit 120 adjusts the local cellular time to the determined time at the courtesy location. The processor 122 applies an algorithm to determine the number of time zones between the courtesy location and the telematics unit location and the resultant amount of time between the courtesy location and the telematics unit location. The processor 122 also applies an algorithm to determine if the change in time zones requires that time be added to or subtracted from the current local time. The processor 122 adds or subtracts the calculated number of hours from the current local time at the telematics unit location. The processor 122 stores the current time at the courtesy location in the in-vehicle memory 128. In one embodiment, the processor 122 temporarily stores the current time at the courtesy location in the in-vehicle memory 128. The flow proceeds to stage S408.

During stage S408, the telematics unit 120 determines if the date at the courtesy location is the same as the local cellular date at the telematics unit (TU) location based on the International Date Line as described above with reference to stage S308 of method 300 in FIG. 3. The processor 122 applies an algorithm to a date look-up table in the in-vehicle memory 128 to determine if the date at courtesy location is different from the local cellular date at the telematics unit location. If the date at the courtesy location is the same as the local cellular date at the telematics unit location, the flow proceeds to stage S412.

If the courtesy location date is not the same as the local cellular date at the telematics unit location, the flow proceeds to stage S410. During stage S410, the local cellular date is adjusted to determine the date at the courtesy location. The processor 122 adds one day to or subtracts one day from the local cellular date at the telematics unit location according the determination made during stage S408. The processor 122 stores the current date at the courtesy location in the in-vehicle memory 128. In one embodiment, the processor 122 temporarily stores the current date at the courtesy location in the in-vehicle memory 128. The flow proceeds to stage S412.

During stage S412, the telematics unit 120 determines whether the courtesy date is the same as the date at the courtesy location based on the local cellular date signal received during stage S402 and any modifications to the local cellular date resulting from algorithms applied during stage S410. To make the determination, the processor 122 compares the courtesy date with the unadjusted local cellular date or, if an adjustment was made during stage S410, the processor 122 compares the courtesy date with the adjusted local cellular date that was stored in the in-vehicle memory 128.

During stage S414, the telematics unit 120 determines whether the courtesy time is the same as the time at the courtesy location based on the local cellular time signal received during stage S402 and any modifications to the local cellular time resulting from algorithms applied during stage S406. To make the determination, the processor 122 compares the courtesy time with the unadjusted local cellular time or, if an adjustment was made during stage S406, the processor 122 compares the courtesy time with the adjusted local cellular time that was stored in the in-vehicle memory 128. The processor 122 compares the courtesy time with the adjusted local cellular time that was stored in the in-vehicle memory 128 during stage S406 to make the determination.

When a positive determination is made during stages S412 and S414, the flow proceeds to stage S208 described above with reference to method 200 of FIG. 2.

In one embodiment, the call center 170 performs the functions ascribed to the telematics unit 120 as described above for method 400. In this case, one or more communication services databases 176 perform the functions of the in-vehicle memory 128, and one or more communication services managers 174 perform the function of the processor 120. In another embodiment, the call center 170 and telematics unit 120 each perform at least some of the functions of the telematics unit 120 as described above for method 400. In yet another embodiment, the call center 170 performs the functions of the telematics unit 120 as described above for method 400 and transmits the adjusted current local time and date to the telematics unit 120 when a positive determination is made during stages S412 and S414. In yet another embodiment, the telematics unit 120 transmits the adjusted current local time and date to the telematics unit 120 when a positive determination is made during stages S412 and S414 so that the call center 170 can initiate a courtesy notification to the courtesy number.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of providing courtesy notifications from a mobile vehicle, the method comprising:

receiving a courtesy notification user input at a vehicle telematics unit, the courtesy notification user input including a courtesy date, a courtesy time, a first courtesy number, a second courtesy number, and a number of times to retry the first courtesy number;

receiving a time and a date at the telematics unit;

determining whether the courtesy time and the courtesy date correspond respectively to the received time and the received date;

initiating at least one call to the first courtesy number based on the determination and in accordance with the number of times to retry the first courtesy number;

determining whether a response is received at the first courtesy number; and initiating at least one call to the second courtesy number if it is determined that no response is received at the first courtesy number.

2. The method of claim 1, wherein the first and second courtesy numbers are selected from the group consisting of a home phone number, a wireless cell phone number, a pager phone number, a portable wireless communication device number, a personal digital assistant number, an email address, a landline phone number, a hotel phone number, and combinations thereof.

3. The method of claim 1, wherein receiving a time and a date at the telematics unit comprises:

receiving a global positioning system signal at the vehicle telematics unit, the global positioning system signal including a local global positioning system time and a local global positioning system date.

4. The method of claim 3, wherein determining whether the courtesy time and the courtesy date correspond respectively to the received time and the received date comprises:

determining whether the courtesy time and the courtesy date correspond respectively to the time at the courtesy location and the date at the courtesy location based on the received local global positioning system time and local global positioning system date.

5. The method of claim 1, wherein receiving a time and a date at the telematics unit comprises:

receiving a local cellular time signal and a local cellular date signal at the vehicle telematics unit.

6. The method of claim 5, wherein determining whether the courtesy time and the courtesy date correspond respectively to the received time and the received date comprises:

determining whether the courtesy time and the courtesy date correspond respectively to the time at the courtesy location and the date at the courtesy location based on the local cellular time signal and local cellular date signal received at the vehicle telematics unit.

7. The method of claim 1, wherein the courtesy notification user input further comprises data selected from the group consisting of a number of days to call, a number of times to retry the second courtesy number, a hotel indicator, and combinations thereof.

8. The method of claim 7, further comprising:

announcing the courtesy message to the user at the courtesy time and courtesy date at the courtesy location.

9. The method of claim 7, further comprising:

displaying the courtesy message to the user on a display on a portable communication device at the courtesy time and courtesy date at the courtesy location.

10. The method of claim 1, wherein the courtesy notification user input is received at the telematics unit via an input mechanism, wherein the input mechanism is selected from the group consisting of a voice recognition system in the telematics unit, an advisor in a telematics system, a computer in communication with the telematics system, a wireless portable communication device, a personal digital assistant, and combinations thereof.

11. A computer readable medium storing a computer program comprising:

computer readable code for receiving courtesy notification user input at a vehicle telematics unit, the courtesy notification user input including a courtesy date, a courtesy time, a first courtesy number, a second courtesy number, and a number of times to retry the first courtesy number;

computer readable code for receiving a time and a date at the telematics unit;

computer readable code for determining whether the courtesy time and the courtesy date correspond respectively to the received time and the received date;

computer readable code for initiating at least one call to the first courtesy number based on the determination and in accordance with the number of times to retry the first courtesy number;

computer readable code for determining whether a response is received at the first courtesy number; and computer readable code for initiating at least one call to the second courtesy number if it is determined that no response is received at the first courtesy number.

12. The medium of claim 11, wherein the computer readable code for receiving a time and a date at the telematics unit comprises:

computer readable code for receiving a global positioning system signal at the vehicle telematics unit, the global positioning system signal including a local global positioning system time and a local global positioning system date.

13. The medium of claim 12, wherein the computer readable code for determining whether the courtesy time and the courtesy date correspond respectively to the received time and the received date comprises:

computer readable code for determining whether the courtesy time and the courtesy date correspond respectively to the time at the courtesy location and the date at the courtesy location based on the received local global positioning system time and local global positioning system date.

14. The medium of claim 11, wherein the computer readable code for receiving a time and a date at the telematics unit comprises:

computer readable code for receiving a local cellular time signal and local cellular date signal at the vehicle telematics unit.

15. The medium of claim 14, wherein the computer readable code for determining whether the courtesy time and the courtesy date correspond respectively to the received time and the received date comprises:

computer readable code for determining whether the courtesy time and the courtesy date correspond respectively to the time at the courtesy location and the date at the courtesy location based on the local cellular time signal and local cellular date signal received at the vehicle telematics unit.

16. The medium of claim 11, wherein the courtesy notification user input further comprises a courtesy message and the computer readable code for providing courtesy notifications from a mobile vehicle further comprises:

computer readable code for announcing the courtesy message to the user at the courtesy time and courtesy date at the courtesy location.

17. The medium of claim 11, wherein the courtesy notification user input further comprises a courtesy message and the computer readable code for providing courtesy notifications from a mobile vehicle further comprises:

computer readable code for displaying the courtesy message to the user on a display on a portable communication device at the courtesy time and courtesy date at the courtesy location.

18. A system of providing courtesy notifications from a mobile vehicle, the system comprising:

means for receiving courtesy notification user input at a vehicle telematics unit, the courtesy notification user input including a courtesy date, a courtesy time, a first courtesy number, a second courtesy number, and a number of times to retry the first courtesy number;

means for receiving a time and a date at the telematics unit;

means for determining whether the courtesy time and the courtesy date correspond respectively to the received time and the received date;

means for initiating at least one call to the first courtesy number based on the determination and in accordance with the number of times to retry the first courtesy number;

means for determining whether a response is received at the first courtesy number; and means for initiating at least one call to the second courtesy number if it is determined that no response is received at the first courtesy number.

19. The system of claim 18, further comprising:

means for announcing a courtesy message to the user at the courtesy time and courtesy date at the courtesy location.

20. The system of claim 18, wherein the system further comprises:

means for displaying a courtesy message to the user on a display on a portable communication device at the courtesy time and courtesy date at the courtesy location.

* * * * *